Nov. 25, 1924.                          1,517,027
C. W. SMITH
COUPLING AND ANTIFRICTION GUIDE FOR SUCKER RODS
Filed Sept. 13, 1923        2 Sheets-Sheet 2
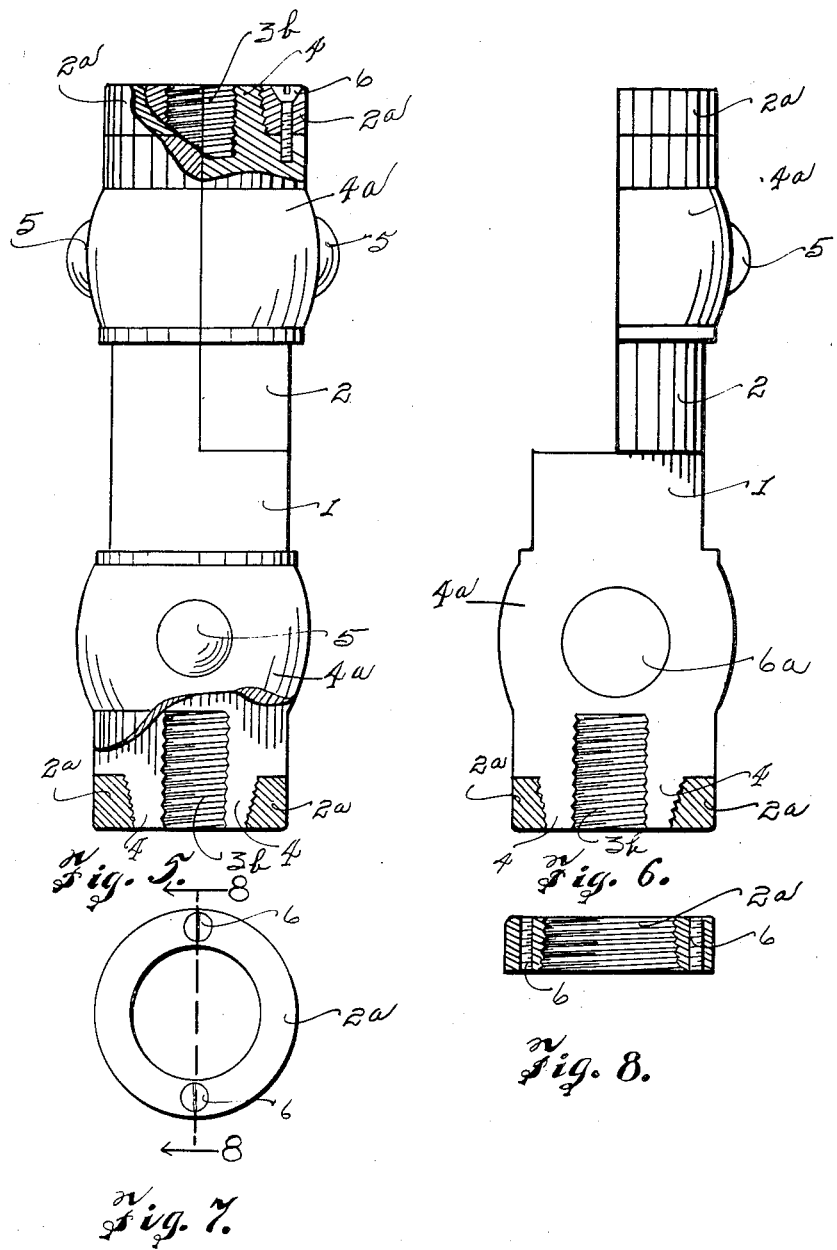
Clarence W. Smith
INVENTOR.
BY John M. Spellman
ATTORNEYS.

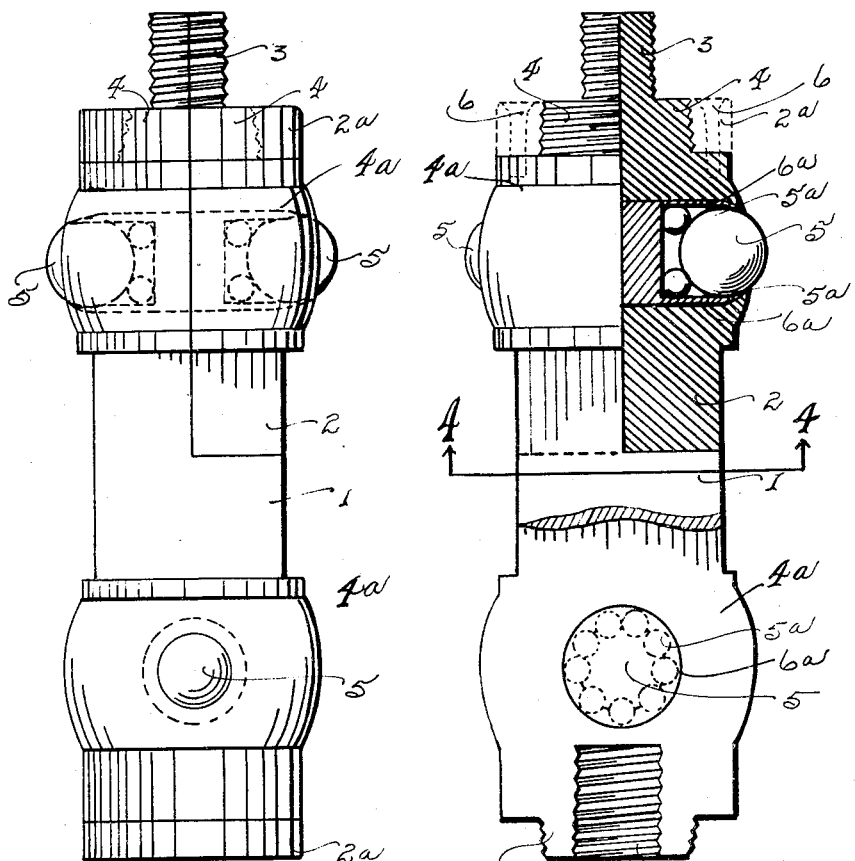
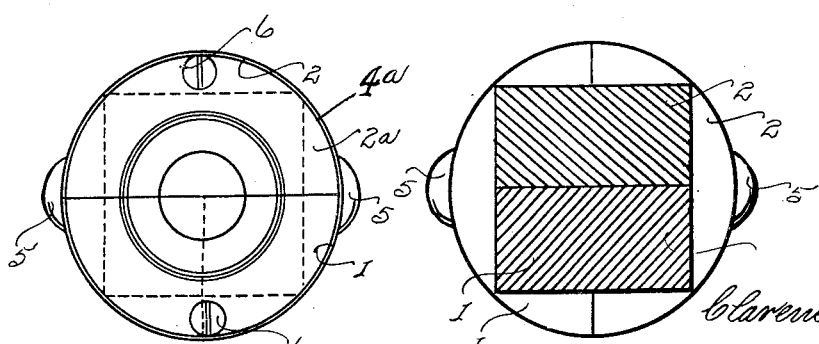

Patented Nov. 25, 1924.

1,517,027

UNITED STATES PATENT OFFICE.

CLARENCE W. SMITH, OF MEXIA, TEXAS, ASSIGNOR OF SIXTY-FIVE PER CENT TO CASIMIR P. McKENZIE, OF MEXIA, TEXAS.

COUPLING AND ANTIFRICTION GUIDE FOR SUCKER RODS.

Application filed September 13, 1923. Serial No. 662,529.

*To all whom it may concern:*

Be it known that I, CLARENCE W. SMITH, a citizen of the United States, residing at Mexia, in the county of Limestone and State of Texas, have invented certain new and useful Improvements in Couplings and Antifriction Guides for Sucker Rods, of which the following is a specification.

This invention relates to deep well pumping apparatus, and refers more particularly to a means for joining sucker rods, and at the same time affording a guide for the rods in the tubing.

The object being to provide a device that will embody protective means in the boxing joining the sucker rods, to lessen the wear of the boxing against the inner periphery of the tubing, and to provide at the same time a substantial means for joining the sucker rods.

Features of the invention are the simplicity of construction and the method of locking the elements together rigidly when assembled, and the arrangement of a double ball bearing element in the device which will contact with the inner walls of the tubing.

Other objects and features as well as those heretofore mentioned, will be set forth in the following description, of which the drawings attached hereto form a part, and in which;

Figure 1 represents a side elevation of an embodiment of the invention, for use with standard sucker rods.

Figure 2 is an elevational view partly in section.

Figure 3 is a top or plan view.

Figure 4 is a view taken on line 4—4 on Figure 2.

Figure 5 is an embodiment of the invention to be used with sucker rods, having an external or male thread at both ends.

Figure 6 is a view of one of the main body elements.

Figure 7 is a top or plan view of the engagement means by which the elements of the device are held in rigid relationship, one to the other.

Figure 8 is a cross-section of Figure 7 on lines 8—8.

In Figures 1 and 2, the body is cut from either end toward the center in the fashion shown in the drawings, to form the main body elements 1 and 2, each element having enlarged portions $4^a$, one of which has an extension 3 thereon, which is exteriorly threaded, the other portion having an interior thread $3^a$. Centrally located in the interior of each enlargement of each body member, is a recess adapted to receive a bearing cup $6^a$, bearing 5 running freely therein on bearings $5^a$, protrudes through an opening in the enlarged portion, and contacts with the inner walls of the tubing, wherein the device is used, this opening being of lesser diameter than the bearing 5. The bearing cups $6^a$ are alined with their closed ends abutted one against the other, when the device is assembled, and the collar 3 threaded to engage the tapered shoulder 4, when tightened, draws the two body elements tightly together, and brings the bearing cups snugly into place. After the collar is thus adjusted, the set screw or screws 6—6 are tightened to hold it in place.

The assembly thus obtained is extremely rigid and the wear or friction of the boxing against the tubing is sustained wholly by the bearings.

In Figure 4, the manner of cutting or shaping the body elements is shown, the latter being cut to the center of the assembly with cuts at right angles one to the other from each end of the assembly, there being one-half of each enlarged member $4^a$ on each end of each body member, the halves being inter-fitting between the enlarged ends to form a bearing shoulder for the members at the center of the assembly. The central portion of the assembly is angular, preferably square, to be readily engaged by a wrench, to screw or unscrew the boxing and the rods.

In Figure 5, a modification of the invention, the same construction as shown in Figures 1 and 2 is used, with the exception that the enlarged members are interiorly threaded to engage sucker rods having both extremities with an exterior thread.

In Figure 6 the body element 1 is shown, and the preferred construction more clearly set forth.

In Figures 7 and 8 the member engaging collar is shown.

It should be understood that the shape and size of the elements and the nature of the cutting for the shoulders may vary somewhat without departing from the spirit and intent of the invention.

What is claimed is:

1. In a device of the character described, a pair of interfitting body members, a plurality of ball bearings, retaining cups for the bearings, recesses in the members adapted to receive the cups and bearings, means for joining the members together, means to secure the joining means, and threaded means at each end of the assembly to engage the extremities of sucker rods.

2. A sucker rod boxing and protector, having a pair of interlocking sections, a plurality of ball bearings in each section, recesses in the interiors of the sections, ball bearing retaining cups, adapted to be seated in said recesses, exterior openings through the recessed portions of smaller diameter than the bearings, the assembly of the sections having an angular periphery at its central portion, and an enlarged substantially circular periphery at its extremities, means for joining the sections together in assembly, and means at each end of the assembly to engage sucker rods.

3. An anti-friction rod guide and coupling comprising a pair of inter-fitting sections, a plurality of ball bearings adjacent each end of each section, retaining cups for the bearings, recesses in the sections to receive the cups, and exterior openings from the recessed portions, to allow the bearings to protrude therethrough, and means to rigidly fasten the sections together.

4. An anti-friction guide and coupler for sucker rods, comprising two inter-fitting sections, interior recesses in said sections, ball bearings, cups adapted to be seated in said recesses, to retain said bearings within said recesses, openings through the recesses to the outer surface or periphery of the assembly, said openings being of smaller diameter than the bearings, to allow same to protrude therethrough, means for joining the sections rigidly together, and to hold the cups of the two sections adjacent and alined at each end of the assembly.

In testimony whereof I have signed my name to this specification.

CLARENCE W. SMITH.